US012630672B2

(12) United States Patent
 Okajima et al.

(10) Patent No.: US 12,630,672 B2
(45) Date of Patent: May 19, 2026

(54) CRYSTALLINE POLYESTER RESIN AND POLYESTER RESIN AQUEOUS DISPERSION, AND COMPOSITION FOR ADHESION OR COATING USE IN WHICH EACH OF SAID CRYSTALLINE POLYESTER RESIN AND POLYESTER RESIN AQUEOUS DISPERSION IS USED

(71) Applicant: TOYOBO MC Corporation, Osaka (JP)

(72) Inventors: Hiroki Okajima, Shiga (JP); Tadahiko Mikami, Shiga (JP); Ryosuke Kanda, Shiga (JP)

(73) Assignee: TOYOBO MC CORPORATION, Osaka (JP)

( * ) Notice: Subject to any disclaimer, the term of this patent is extended or adjusted under 35 U.S.C. 154(b) by 198 days.

(21) Appl. No.: 18/283,582

(22) PCT Filed: Mar. 22, 2022

(86) PCT No.: PCT/JP2022/013260
 § 371 (c)(1),
 (2) Date: Sep. 22, 2023

(87) PCT Pub. No.: WO2022/202832
 PCT Pub. Date: Sep. 29, 2022

(65) Prior Publication Data
 US 2024/0174798 A1 May 30, 2024

(30) Foreign Application Priority Data
 Mar. 25, 2021 (JP) ................................. 2021-051909

(51) Int. Cl.
 B65D 65/42 (2006.01)
 C08G 63/137 (2006.01)
 C08G 63/183 (2006.01)
 C08G 63/199 (2006.01)
 C08G 63/688 (2006.01)
 C08J 7/04 (2020.01)
 C08K 3/36 (2006.01)
 C08K 7/22 (2006.01)
 C09D 7/40 (2018.01)
 C09D 7/45 (2018.01)
 C09D 7/61 (2018.01)
 C09D 7/63 (2018.01)
 C09D 7/65 (2018.01)
 C09D 167/02 (2006.01)
 C09J 11/04 (2006.01)
 C09J 11/06 (2006.01)
 C09J 11/08 (2006.01)
 C09J 167/02 (2006.01)
(52) U.S. Cl.
 CPC ......... *C08G 63/6886* (2013.01); *B65D 65/42* (2013.01); *C08G 63/137* (2013.01); *C08G 63/183* (2013.01); *C08G 63/199* (2013.01);

*C08G 63/6884* (2013.01); *C08J 7/0427* (2020.01); *C08K 3/36* (2013.01); *C08K 7/22* (2013.01); *C09D 7/45* (2018.01); *C09D 7/61* (2018.01); *C09D 7/63* (2018.01); *C09D 7/65* (2018.01); *C09D 7/69* (2018.01); *C09D 167/02* (2013.01); *C09J 11/04* (2013.01); *C09J 11/06* (2013.01); *C09J 11/08* (2013.01); *C09J 167/02* (2013.01); *C08J 2367/00* (2013.01); *C08J 2467/02* (2013.01); *C08K 2201/005* (2013.01)

(58) Field of Classification Search
 CPC ....... C09D 167/02; C08L 67/02; C08G 63/12; C08G 63/16; C08G 63/183; C08G 63/199
 See application file for complete search history.

(56) References Cited

U.S. PATENT DOCUMENTS

| | | | | |
|---|---|---|---|---|
| 5,318,833 A | * | 6/1994 | Fujimoto | C08K 3/36 428/307.3 |
| 2010/0092704 A1 | * | 4/2010 | Takesue | C08L 67/00 428/35.2 |

(Continued)

FOREIGN PATENT DOCUMENTS

| | | | | |
|---|---|---|---|---|
| GB | 2097005 A | * | 10/1982 | C08L 67/02 |
| JP | 4298539 | | 10/1992 | |

(Continued)

OTHER PUBLICATIONS

International Search Report issued May 31, 2022 in International (PCT) Application No. PCT/JP2022/013260.

(Continued)

*Primary Examiner* — Michael C. Romanowski
(74) *Attorney, Agent, or Firm* — Wenderoth, Lind & Ponack, L.L.P.

(57) ABSTRACT

An object of the present invention is to provide an adhesive composition and a coating composition that have storage stability, high adhesiveness, and excellent blocking resistance and water resistance. The present invention provides a crystalline polyester resin comprising: a polyvalent carboxylic acid component and polyhydric alcohol component as a copolymerization components, wherein, 30 to 70 mol % of terephthalic acid, 10 to 60 mol % of 1,4-cyclohexanedicarboxylic acid, 5 to 30 mol % of aliphatic dicarboxylic acid having 10 or smaller of carbon atoms, and less than 3 mol % of an aromatic dicarboxylic acid component having a sulfonate group are contained as the polyvalent carboxylic acid component; and 50 to 100 mol % of 1,4-butanediol is contained as the polyhydric alcohol; wherein, an acid value of the crystalline polyester resin is 100 to 600 eq/t; a glass transition temperature of the crystalline polyester resin is −30 to 30° C.; a melting point of the crystalline polyester resin is 70 to 160° C.; and a number-average molecular weight of the crystalline polyester resin is 5000 to 40000.

18 Claims, No Drawings

(56)     References Cited

U.S. PATENT DOCUMENTS

| 2020/0063006 A1* | 2/2020 | Mikami | .................. B32B 27/32 |
| 2023/0078293 A1* | 3/2023 | Mikami | .............. C08G 63/183 |
| | | | 428/35.7 |

FOREIGN PATENT DOCUMENTS

| JP | H06108027 | A | * | 4/1994 |
| JP | H08295792 | A | * | 11/1996 |
| JP | 2002-371128 | | | 12/2002 |
| JP | 2002371128 | A | * | 12/2002 |
| JP | 2003-327676 | | | 11/2003 |
| JP | 2003327676 | A | * | 11/2003 |
| JP | 2007277497 | A | * | 10/2007 |
| JP | 2009-84349 | | | 4/2009 |
| JP | 2009084349 | A | * | 4/2009 |
| JP | 4596998 | | | 12/2010 |
| JP | 2013-18942 | | | 1/2013 |
| JP | 5241232 | | | 7/2013 |
| WO | 2015/045633 | | | 4/2015 |
| WO | 2021/166882 | | | 8/2021 |

OTHER PUBLICATIONS

Extended European Search Report issued Feb. 21, 2025 in corresponding European Patent Application No. 22775614.5.
Japanese Office Action issued Jan. 6, 2026 in corresponding Japanese Patent Application No. 2023-509209, with English machine translation.
Japanese Office Action issued Sep. 30, 2025 in corresponding Japanese Patent Application No. 2023-509209, with English machine translation.

* cited by examiner

CRYSTALLINE POLYESTER RESIN AND POLYESTER RESIN AQUEOUS DISPERSION, AND COMPOSITION FOR ADHESION OR COATING USE IN WHICH EACH OF SAID CRYSTALLINE POLYESTER RESIN AND POLYESTER RESIN AQUEOUS DISPERSION IS USED

TECHNICAL FIELD

The present invention relates to crystalline polyester resin and polyester resin aqueous dispersion, and a composition for adhesion or coating use. More preferably, the present invention relates to an adhesive and a coating agent that contain polyester resin aqueous dispersion as a main component, and particularly have excellent storage stability, adhesiveness, blocking resistance, and water resistance.

BACKGROUND ART

Polyester resin is widely used as a raw material of a resin composition used for coating materials, coating agents, adhesives, and the like. Polyester resin is typically formed of polyvalent carboxylic acid and polyhydric alcohol. Selection and combination of the polyvalent carboxylic acids and the polyhydric alcohols can be freely controlled, and whether a molecular weight is to be high or low can be freely determined. The obtained polyester resin is used for various usages such as usages for coating materials, adhesives, and the like.

In molecular design for the polyester resin, selection of copolymerization components is important. Polyvalent carboxylic acid components and polyhydric alcohol components are mainly classified into, for example, aromatic, aliphatic, and alicyclic components. A glass transition temperature representing flexibility of polyester resin can be determined according to the selection of the components. The polyester resin is typically used by being applied to a base material in the form of a product dissolved in an organic solvent or aqueous dispersion. Particularly, in recent years, aqueous dispersion thereof has been desired in view of environmental issues.

In recent years, polyester containers having excellent transparency and recyclability have been widely used as packaging materials for perishable foods such as vegetables and fruits. The best before date of the perishable foods can be extended by fully sealing the perishable foods, and the polyester containers are attracting interest as one of candidates contributing to food distribution revolution. According thereto, lids for the packaging materials are required to be hygienic, and to have ensured adhesiveness until a content is taken out, blocking resistance during winding of a film, and water resistance and anti-fogging property for preventing a content from being clouded due to a water content.

For example, Patent Literature 1 suggests aqueous dispersion in which polyester resin (A) having a glass transition temperature of 50° C. or higher and polyester resin (B) having a glass transition temperature of 30° C. or lower are blended with each other. Patent Literature 2 suggests crystalline copolymerization polyester resin which contains 75 mol % or more of a C4 to C10 linear aliphatic diol component, has a melting point of 90° C. or higher and 130° C. or lower, contains aromatic dicarboxylic acid having sulfonic acid metal salt in a range of 2 mol % or more and 5 mol % or smaller as a polyvalent carboxylic acid component, and has an acid value of smaller than 4 mg KOH/g.

CITATION LIST

Patent Literature

[PTL 1] Japanese Patent No. 5241232
[PTL 2] International Publication No. WO2015/045633

SUMMARY OF THE INVENTION

Problems to be Solved by the Invention

However, according to Patent Literature 1, the polyester resin (B) is amorphous, peel strength indicated in Examples is not practical, and there is a problem that both blocking resistance and heat-sealability cannot be achieved. Patent Literature 2 discloses crystalline polyester resin. However, aromatic dicarboxylic acid having sulfonic acid metal salt is contained, and there is a problem with hygiene and water resistance.

As a result of thorough studies for solving the aforementioned problems in the present invention, it has been found that crystalline polyester in which no sulfonic acid metal salt is used has high adhesiveness, and excellent blocking resistance and water resistance, and the present invention has been completed.

That is, an object of the present invention is to provide an adhesive composition and a coating composition that have storage stability, high adhesiveness, and excellent blocking resistance and water resistance.

Solution to the Problems

A crystalline polyester resin comprising:
a polyvalent carboxylic acid component and polyhydric alcohol component as a copolymerization components, wherein,
30 to 70 mol % of terephthalic acid, 10 to 60 mol % of 1,4-cyclohexanedicarboxylic acid, 5 to 30 mol % of aliphatic dicarboxylic acid having 10 or smaller of carbon atoms, and less than 3 mol % of an aromatic dicarboxylic acid component having a sulfonate group are contained as the polyvalent carboxylic acid component; and
50 to 100 mol % of 1,4-butanediol is contained as the polyhydric alcohol;
wherein,
an acid value of the crystalline polyester resin is 100 to 600 eq/t;
a glass transition temperature of the crystalline polyester resin is −30 to 30° C.;
a melting point of the crystalline polyester resin is 70 to 160° C.; and
a number-average molecular weight of the crystalline polyester resin is 5000 to 40000.
A polyester resin aqueous dispersion containing the above crystalline polyester resin. The polyester resin aqueous dispersion preferably contains 1 mass % or less of an organic solvent. The polyester resin aqueous dispersion preferably contains 0.1 to 10 parts by mass of an inorganic particles having average particle diameter of 1 μm or more to 10 μm or less when the total amount of the crystalline polyester resin is taken as 100 parts by mass. The polyester resin aqueous dispersion preferably has smaller than 2.0 mL/g of a pore volume of the inorganic particle. The polyester resin aqueous dispersion preferably contains 0.1 to 10 parts by mass of a surfactant which is at least one selected from a group of an anionic surfactant and a nonionic surfactant when the total amount of the crystalline polyester resin is taken as 100 parts by mass. And the nonionic surfactant preferably has a HLB value of 6.5 to 14 and a polyoxyalkylene skeleton.

A polyester resin aqueous dispersion containing the above crystalline polyester resin. A composition for adhesion or coating, comprising the above polyester resin aqueous dispersion. A laminated film formed by laminating a layer formed by applying the above composition for adhesion or coating and a thermoplastic resin film. The thermoplastic resin film is preferably a polyester-based resin film. A thickness of the layer of the composition for adhesion or coating is preferably in a range of 0.5 μm to 10 μm.

A packaging material, comprising the above laminated film. A lid member for food packaging container, comprising the above packaging material as a constituting component. A food packaging container constituted of a laminate of a polyester-based resin and the above lid.

Advantageous Effects of the Invention

The crystalline polyester resin of the present invention allows aqueous dispersion having excellent storage stability, adhesiveness, blocking resistance, and water resistance to be produced without using sulfonic acid metal salt. Particularly, when the adhesive composition in which the crystalline polyester resin aqueous dispersion is used is heat-sealed as a lid for a packaging container, the adhesive composition exhibits excellent adhesiveness to a base material. Furthermore, since a raw material approved by the FDA is used, safety is excellent, and the present invention can be suitably used as a packaging material for perishable foods and the like.

DESCRIPTION OF EMBODIMENTS

An embodiment of the present invention will be described below in detail.
<Crystalline Polyester Resin>
Crystalline polyester resin of the present invention has a chemical structure obtained by polycondensate of polyvalent carboxylic acid and polyhydric alcohol, and each of the polyvalent carboxylic acid and the polyhydric alcohol is formed of one or more kinds of selected components.

In the present invention, the polyvalent carboxylic acid constituting the crystalline polyester resin is preferably aromatic dicarboxylic acid, alicyclic dicarboxylic acid, and/ or aliphatic dicarboxylic acid.

In a case where the total amount of a polyvalent carboxylic acid component is 100 mol %, a copolymerization amount of terephthalic acid needs to be 30 to 70 mol %, and is preferably 35 to 65 mol % and more preferably 40 to 60 mol %. In a case where the copolymerization amount is 30 mol % or more, the obtained polyester resin becomes crystalline, and has good blocking resistance. In a case where the copolymerization amount is 70 mol % or smaller, the melting point does not become excessively high, melting can be performed with a heat amount in heat-sealing, and adhesiveness is good.

In a case where the total amount of the polyvalent carboxylic acid component is 100 mol %, a copolymerization amount of 1,4-cyclohexanedicarboxylic acid needs to be 10 to 60 mol %, and is preferably 15 to 55 mol % and more preferably 20 to 50 mol %. In a case where the copolymerization amount is 10 mol % or more, the obtained polyester resin does not have an excessively high glass transition temperature, and has good adhesiveness. In a case where the copolymerization amount is 60 mol % or smaller, the crystallinity of the polyester resin is enhanced, and blocking resistance becomes good.

In a case where the total amount of the polyvalent carboxylic acid component is 100 mol %, the total of the copolymerization amounts of terephthalic acid and 1,4-cyclohexanedicarboxylic acid is preferably 40 mol % or more, more preferably 50 mol % or more, even more preferably 60 mol % or more, still more preferably 70 mol % or more, and particularly preferably 80 mol % or more. Meanwhile, the total of the copolymerization amounts is preferably 95 mol % or smaller, more preferably 93 mol % or smaller, and even more preferably 90 mol % or smaller. Within the above-described ranges, adhesiveness and blocking resistance become good.

In a case where the total amount of the polyvalent carboxylic acid component is 100 mol %, a copolymerization amount of aliphatic dicarboxylic acid is preferably 5 to 30 mol %, more preferably 10 to 25 mol %, and even more preferably 15 to 22 mol %. In a case where the copolymerization amount of aliphatic dicarboxylic acid is 5 to 30 mol %, a crystallization speed of the crystalline polyester resin is enhanced, and blocking resistance is easily exhibited. The number of carbon atoms in the aliphatic dicarboxylic acid is 10 or smaller and more preferably 8 or smaller, and preferably 2 or more and more preferably 4 or more. In a case where the aliphatic dicarboxylic acid in which the number of carbon atoms is 10 or smaller is copolymerized, crystallinity of polyester resin is enhanced, and hydrolysis resistance becomes good. Examples of the aliphatic dicarboxylic acid in which the number of carbon atoms is 10 or smaller include adipic acid, sebacic acid, succinic acid, fumaric acid, maleic acid, and itaconic acid. Adipic acid is particularly preferable because adipic acid is a raw material indicated in and approved by FDA (Food and Drug Administration) standard 175.300 (b) (3) (vii) (revised on Apr. 1, 2020), can be suitably used for a food packaging material, and is good from the viewpoint of adhesiveness to a base material, water resistance, cost, and the like.

As a polyvalent carboxylic acid component other than terephthalic acid, 1,4-cyclohexanedicarboxylic acid, and the aliphatic dicarboxylic acid in which the number of carbon atoms is 10 or smaller, isophthalic acid, orthophthalic acid, 2,6-naphthalenedicarboxylic acid, dimethyl 2,6-naphthalenedicarboxylate, trimellitic acid, or dimer acid is preferably used. One of them may be used alone or two or more of them may be used in combination. Furthermore, as 1,4-cyclohexanedicarboxylic acid, a cis-form one or a cis/ trans-mixture is preferably used. However, as 1,4-cyclohexanedicarboxylic acid, a trans form one may be used alone. These compounds are raw materials indicated in and approved by FDA (Food and Drug Administration) standard 175.300 (b) (3) (vii) (revised on Apr. 1, 2020), and can be suitably used as food packaging materials. Among them, isophthalic acid is preferably used in combination from the viewpoint of adhesiveness to a base material, water resistance, cost, and the like. A copolymerization amount of the other polyvalent carboxylic acid component is preferably 40 mol % or smaller, more preferably 35 mol % or smaller, and even more preferably 30 mol % or smaller in a case where the total amount of the polyvalent carboxylic acid component is 100 mol %. In a case where the copolymerization amount is 40 mol % or smaller, the crystalline polyester resin has enhanced hydrolysis resistance and good water resistance. Meanwhile, the lower limit thereof is not particularly limited, but is preferably 5 mol % or more and more preferably 10 mol % or more in a case where the polyvalent carboxylic acids are copolymerized.

In a case where the total amount of a polyhydric alcohol component is 100 mol %, a copolymerization amount of 1,4-butanediol needs to be 50 to 100 mol %, and is preferably 60 to 100 mol %, more preferably 70 to 100 mol %, even more preferably 80 to 100 mol %, still more preferably 90 to 100 mol %, and particularly preferably 95 mol % or more, and it does not matter even if the copolymerization amount is 100 mol %. In a case where the copolymerization amount is 50 mol % or more, the obtained polyester resin becomes crystalline and has good blocking resistance.

As a polyhydric alcohol component other than 1,4-butanediol, a compound indicated in FDA standard 175.300 (b) (3) (vii) (revised on Apr. 1, 2020) is preferably used. Specific examples thereof include ethylene glycol, diethylene glycol, triethylene glycol, propylene glycol, 2,2-dimethyl-1,3-propanediol, glycerol, mannitol, pentaerythritol, trimethylolethane, and trimethylolpropane. In a case where the total amount of the polyhydric alcohol component is 100 mol %, a copolymerization amount of the other polyhydric alcohol component needs to be 50 mol % or smaller, and is preferably 40 mol % or smaller, more preferably 30 mol % or smaller, even more preferably 20 mol % or smaller, still more preferably 10 mol % or smaller, and particularly preferably 5 mol % or smaller, and it does not matter even if the copolymerization amount is 0 mol %. In a case where the copolymerization amount is 50 mol % or smaller, the obtained polyester resin becomes crystalline and has good blocking resistance.

In the present invention, a branched structure is also preferably introduced by copolymerization of a small amount of tri- or higher functional polyvalent carboxylic acid component and polyhydric alcohol component in the crystalline polyester resin. Thus, a tougher adhesive composition layer (hereinafter, may also be referred to as adhesive layer) or coating composition layer (hereinafter, may also be referred to as coating layer) can be formed, and an effect of enhancing water resistance can be exhibited. Specific examples thereof include trimellitic anhydride, ethylene glycol bisanhydrotrimellitate, trimethylolpropane, glycerin, and pentaerythritol. In a case where the total amount of all the polyvalent carboxylic acid components and all the polyhydric alcohol components is 200 mol %, a copolymerization amount of the tri- or higher functional polyvalent carboxylic acid component and polyhydric alcohol component is preferably 0.5 mol % or more and more preferably 1 mol % or more, and preferably 5 mol % or smaller, more preferably 4 mol % or smaller, and even more preferably 3 mol % or smaller.

In a case where the total amount of the polyvalent carboxylic acid component is 100 mol %, a content of an aromatic dicarboxylic acid component having a sulfonate group needs to be smaller than 3 mol %. The content thereof is more preferably 0.5 mol % or smaller, even more preferably 0.1 mol % or smaller, and particularly preferably 0 mol %. The aromatic dicarboxylic acid component having a sulfonate group is an acid component which is not included in components approved by the FDA. Therefore, by reducing an amount of the aromatic dicarboxylic acid component having a sulfonate group, the crystalline polyester resin of the present invention can be used for usage in which food comes into contact therewith. Examples of the aromatic dicarboxylic acid component having a sulfonate group include 5-sulfoisophthalic acid, 4-sulfonaphthalene-2,7-dicarboxylic acid, 5-[4-sulfophenoxy]isophthalic acid, and alkali metal salts thereof. Examples of the alkali metal for salt include lithium, sodium, and potassium. Specific examples thereof include 5-sulfonatoisophthalic acid sodium, 5-sulfonatoisophthalic acid potassium, 4-sulfonaphthalene-2,7-dicarboxylic acid sodium, and 5-[4-sulfophenoxy]isophthalic acid sodium.

In a case where the total amount of the polyhydric alcohol component is 100 mol %, a content of a polyhydric alcohol component having a sulfonate group is preferably smaller than 3 mol %, more preferably 0.5 mol % or smaller, even more preferably 0.1 mol % or smaller, and particularly preferably 0 mol %. The polyhydric alcohol component having a sulfonate group is an alcohol component which is not included in components approved by the FDA. Therefore, by reducing an amount of the polyhydric alcohol component having a sulfonate group, the crystalline polyester resin of the present invention can be used in usage in which food comes into contact therewith. Examples of the polyhydric alcohol component having a sulfonate group include sodium salt of 2-sulfo-1,4-butanediol and sodium salt of 2,5-dimethyl-3-sulfo-2,5-hexanediol.

Furthermore, for example, acid anhydride such as trimellitic anhydride, pyromellitic dianhydride, and ethylene glycol bisanhydrotrimellitate may be added later (added after polymerization) after polymerization of the polyester resin in order to impart an acid value. In the case of later addition (addition after polymerization), the total amount of the polyvalent carboxylic acid component and the polyhydric alcohol component may become larger than 200 mol %. In this case, the total amount of the components excluding a component obtained by adding later (adding after polymerization) acid anhydride or the like is calculated as 200 mol %.

For the polyvalent carboxylic acid component and the polyhydric alcohol component constituting the crystalline polyester resin of the present invention, a raw material derived from biomass resource can be used. The biomass resource includes, for example, resources stored by converting sunlight energy into the form of starch, cellulose, or the like through photosynthesis of plants, and products obtained by processing bodies of animals that eat plant bodies and grow or processing plant bodies or animal bodies. Among them, the biomass resource is more preferably plant resource, and examples thereof include wood, rice straw, rice hull, rice bran, old rice, maize, sugar cane, cassava, sago palm, soy pulp, corn cob, tapioca meal, bagasse, vegetable oil meal, tubers, buckwheat, soy, fat, waste paper, paper residues, aquatic product residues, livestock excrement, sewage sludge, and food wastes. The biomass resource is even more preferably maize, sugar cane, cassava, or sago palm.

When the crystalline polyester resin of the present invention is produced, for example, a titanium compound such as tetra-n-butyl titanate, tetraisopropyl titanate, and titanium oxyacetylacetonate, an antimony compound such as antimony trioxide and tributoxyantimony, a germanium compound such as germanium oxide and tetra-n-butoxy germanium, and acetates of magnesium, iron, zinc, manganese, cobalt, and aluminium can be used as a polymerization catalyst. One of these catalysts may be used or two or more of these catalysts may be used in combination.

A polycondensation method for producing the crystalline polyester resin of the present invention is, but is not particularly limited to, for example, 1) a method in which polyvalent carboxylic acid and polyhydric alcohol are heated in the presence of any catalyst, and, through dehydration esterification, dealcoholization of the polyhydric alcohol and polycondensation are performed, and 2) a method in which alcohol ester of polyvalent carboxylic acid, and polyhydric alcohol are heated in the presence of any catalyst, and, through transesterification, dealcoholization of the polyhydric alcohol and polycondensation are performed. In the above-described methods 1) and 2), a part or the entirety of the acid component may be substituted with acid anhydride.

A glass transition temperature (Tg) of the crystalline polyester resin of the present invention is −30 to 30° C., preferably −25 to 25° C., and more preferably −20 to 20° C. In a case where the glass transition temperature is the lower limit value or more, when a laminate film is wound into a roll, occurrence of blocking can be inhibited. In a case where the glass transition temperature is the upper limit value or smaller, the resin has flexibility also in peeling at room temperature and has good adhesiveness.

In the present invention, crystallinity represents a structure in which, when a temperature is increased from −100° C. to 250° C. at 20° C./minute, a melting peak clearly appears in the temperature increase process, by using a differential scanning calorimeter (DSC).

A melting point (Tm) of the crystalline polyester resin of the present invention is 70 to 160° C., preferably 75 to 155° C., and more preferably 80 to 150° C. In a case where the melting point is the lower limit value or higher, crystallinity becomes good and excellent blocking resistance can be exhibited. In a case where the melting point is the upper limit value or lower, resin is sufficiently melted even at a low temperature, and sealing does not become poor even when heat sealing is performed at a low temperature. Furthermore, even when a plastic film such as a polyester film is used for a base material to which the crystalline polyester resin is applied, a problem that, for example, the base material is deformed does not arise.

A reduced viscosity ($\eta$sp/c) of the crystalline polyester resin is preferably 0.2 to 1.2 dl/g, more preferably 0.4 to 1.1 dl/g, and even more preferably 0.6 to 1.0 dl/g. In a case where the reduced viscosity is the lower limit value or more, resin cohesion becomes good, and excellent adhesiveness can be exhibited. Meanwhile, in a case where the reduced viscosity is the upper limit value or smaller, aqueous dispersion can be produced. The reduced viscosity can be discretionarily adjusted by changing polymerization time and temperature for the crystalline polyester resin, and a degree of pressure reduction in polymerization (in the case of polymerization under a reduced pressure).

An acid value of the crystalline polyester resin is 100 to 600 eq/t, preferably 150 to 550 eq/t, and more preferably 200 to 500 eq/t. In a case where the acid value is the upper limit value or smaller, the molecular weight does not become low, and resin cohesion thus becomes good, and excellent adhesiveness can be exhibited. In a case where the acid value is the lower limit value or more, aqueous dispersion can be produced.

The number-average molecular weight (Mn) of the crystalline polyester resin is preferably 5000 to 40000, more preferably 6000 to 35000, and even more preferably 8000 to 30000. In a case where the number-average molecular weight is the lower limit value or more, resin cohesion becomes good, and excellent adhesiveness can be exhibited. In a case where the number-average molecular weight is the upper limit value or smaller, aqueous dispersion can be produced. The number-average molecular weight can be discretionarily adjusted by changing polymerization time and temperature for the crystalline polyester resin, and a degree of pressure reduction in the polymerization (in the case of polymerization under a reduced pressure). The number-average molecular weight represents a value measured by gel permeation chromatography (hereinafter, referred to as GPC, standard substance: polystyrene resin, mobile phase: tetrahydrofuran).

<Polyester Resin Aqueous Dispersion>

Polyester resin aqueous dispersion of the present invention is aqueous dispersion that contains the crystalline polyester resin and water, and contains an organic solvent as necessary. In a case where an amount of the polyester resin aqueous dispersion is 100 mass %, an amount of the organic solvent is preferably 50 mass % or smaller, more preferably 30 mass % or smaller, even more preferably 15 mass % or smaller, and particularly preferably 1 mass % or smaller. Although it is not necessary to contain the organic solvent, it is still acceptable if about 0.1 mass % of the organic solvent is contained, from an industrial viewpoint. In a case where the amount of the organic solvent in the polyester resin aqueous dispersion is 50 mass % or smaller, storage stability of the aqueous dispersion is enhanced. A method for producing the polyester resin aqueous dispersion of the present invention is not particularly limited.

A boiling point of the organic solvent to be used for the polyester resin aqueous dispersion of the present invention is preferably 100° C. or higher, more preferably 105° C. or higher, even more preferably 110° C. or higher, particularly preferably 115° C. or higher, and most preferably 120° C. or higher. In a case where the boiling point is 100° C. or higher, the crystalline polyester resin can be melted, and can be aqueously dispersed with ease. Meanwhile, the boiling point is preferably 180° C. or lower, more preferably 175° C. or lower, even more preferably 170° C. or lower, particularly preferably 165° C. or lower, and most preferably 160° C. or lower. In a case where the boiling point is 180° C. or lower, an amount of residual solvent is little in a dried state, and a problem such as occurrence of blocking during winding does not arise.

The organic solvent used for the polyester resin aqueous dispersion of the present invention is not particularly limited. However, examples of the organic solvent include alcohols such as isopropyl alcohol, isobutyl alcohol, and isoamine alcohol, ethylene glycol monomethyl ether, ethylene glycol monoethyl ether, ethylene glycol monoisopropyl ether, ethylene glycol monobutyl ether (hereinafter, may also be referred to as "n-Butyl Cellosolve" or "n-BuCS"), ethylene glycol mono-tert-butyl ether (hereinafter, may also be referred to as "t-Butyl Cellosolve" or "t-BuCS"), propyleneglycolmonobutylether, and methyl ethyl ketone. One of these organic solvents may be used alone or two or more of these organic solvents may be used in combination. Among them, n-Butyl Cellosolve and t-Butyl Cellosolve are particularly preferable.

An amount of the organic solvent is preferably 200 parts by mass or smaller, more preferably 150 parts by mass or smaller, even more preferably 100 parts by mass or smaller, and particularly preferably 50 parts by mass or smaller with respect to 100 parts by mass of the crystalline polyester resin. In a case where the amount of the organic solvent is the upper limit value or smaller, an amount of residual solvent is reduced in a dried state, and a problem such as occurrence of blocking during winding does not arise. Furthermore, storage stability becomes good. The lower limit is not particularly limited. It does not matter if the amount of the organic solvent is 1 part by mass or more, and, furthermore, it does not matter even if the amount of the organic solvent is 10 parts by mass or more, from an industrial viewpoint.

An amount of water is preferably 150 parts by mass or more, more preferably 170 parts by mass or more, and even more preferably 200 parts by mass or more with respect to 100 parts by mass of the crystalline polyester resin. In a case where the amount of water is the lower limit value or more, the crystalline polyester resin is dispersed in water, and the polyester resin aqueous dispersion of the present invention can be obtained. Meanwhile, the amount of water is preferably 500 parts by mass or smaller, more preferably 450 parts by mass or smaller, and even more preferably 400 parts by mass or smaller. In a case where the amount of water is the upper limit value or smaller, production efficiency is enhanced, and it is industrially advantageous.

The particle diameter of the crystalline polyester resin phase contained in the polyester resin aqueous dispersion of the present invention is preferably 20 nm or more, more preferably 30 nm or more, even more preferably 40 nm or more, and particularly preferably 50 nm or more. In a case where the particle diameter is the lower limit value or more, film formability is enhanced, fusion and aggregation of the dispersed particles are inhibited, and increase of viscosity and poor dispersion can be inhibited. The particle diameter is preferably 250 nm or smaller, more preferably 200 nm or smaller, and even more preferably 150 nm or smaller. In a case where the particle diameter is the upper limit value or smaller, excellent dispersion stability and film formability can be maintained, and outer appearance and performance of the obtained coating become good. In the description herein, the particle diameter represents the particle diameter of the crystalline polyester resin, and, in a case where, for example, another polyester resin is contained and two or more kinds of polyester resins are thus contained, the particle diameter represents the average particle diameter of particle diameters of the two or more kinds of polyester resins.

<Inorganic Particle>

In a case where inorganic particles are added to the polyester resin aqueous dispersion of the present invention, blocking resistance and slipperiness after drying can be further enhanced. The average particle diameter of the added inorganic particles as measured by a laser method is preferably 1 μm or more and particularly preferably 2 μm or more. In a case where the average particle diameter is the lower limit value or more, proper unevenness is formed on the surface layer of the coating after drying, and slipperiness and blocking resistance can be enhanced. The average particle diameter is preferably 30 μm or smaller and more preferably 20 μm or smaller. In a case where the average particle diameter is the upper limit value or smaller, unevenness of the coating after drying is reduced, and adhesiveness and slip by physical impact among the particles become good. In a case where an amount of the crystalline polyester is 100 parts by mass, an amount of the inorganic particles to be added is preferably 0.1 parts by mass or more and more preferably 0.2 parts by mass or more. In a case where the amount of the inorganic particles to be contained is the lower limit value or more, the effect of blocking resistance can be exhibited. The amount of the inorganic particles is preferably 10 parts by mass or smaller, more preferably 8 parts by mass or smaller, and even more preferably 7 parts by mass or smaller. In a case where the amount of the inorganic particles is the upper limit value or smaller, adhesiveness can be maintained. In addition, the pore volume of the inorganic particle is preferably smaller than 2.0 mL/g, more preferably smaller than 1.6 mL/g, and even more preferably smaller than 1.0 mL/g. In a case where the pore volume is the upper limit value or smaller, reduction of adhesiveness can be inhibited. The pore volume can be measured by using a nitrogen adsorption measurement apparatus.

The inorganic particles used for the polyester resin aqueous dispersion of the present invention are not particularly limited as long as the inorganic particles have the above-described particle diameter. However, examples of the inorganic particles include inorganic particles containing oxides, hydroxides, sulfates, carbonates, and silicate of metals such as magnesium, calcium, barium, zinc, zirconium, molybdenum, silicon, antimony, and titanium. Among these inorganic particles, silica gel, colloidal silica, and precipitated silica are particularly preferable.

<Surfactant>

In a case where a surfactant is added to the polyester resin aqueous dispersion of the present invention, anti-fogging property and antistatic property can be imparted. The surfactant is preferably an anionic surfactant or a nonionic surfactant. In a case where an anionic surfactant or a nonionic surfactant is used, anti-fogging property can be imparted without impairing adhesiveness. The anionic surfactant and the nonionic surfactant may be used in combination.

Examples of the anionic surfactant include higher alcohol sulfate ester salt, higher alkylsulfonate salt, higher carboxylate salt, alkylbenzenesulfonate salt, polyoxyethylenealkylsulfate salt, polyoxyethylene alkyl phenyl ether sulfate salt, and vinyl sulfosuccinate. One of them may be used alone or two or more of them may be used in combination.

Examples of the nonionic surfactant include compounds having a polyoxyethylene structure such as polyoxyethylene alkyl ether, polyoxyethylene alkyl phenyl ether, polyethylene glycol fatty acid ester, ethylene oxide-propylene oxide block copolymers, polyoxyethylene fatty acid amide, and ethylene oxide-propylene oxide copolymers, and sorbitan derivatives. One of them may be used alone or two or more of them may be used in combination.

In a case where the amount of the crystalline polyester resin is 100 parts by mass, an amount of the surfactant to be added is preferably 0.1 parts by mass or more, more preferably 0.3 parts by mass or more, and even more preferably 0.7 parts by mass or more. In a case where the amount of the surfactant is the lower limit value or more, anti-fogging property becomes good. Meanwhile, the amount of the surfactant is preferably 10 parts by mass or smaller, more preferably 9 parts by mass or smaller, even more preferably 8 parts by mass or smaller, and particularly preferably 7 parts by mass or smaller. In a case where the amount of the surfactant is the upper limit value or smaller, adhesiveness can be maintained.

In the nonionic surfactant, the HLB value of the nonionic surfactant is preferably 6 or more, more preferably 6.5 or more, and even more preferably 7 or more. In a case where the HLB value of the nonionic surfactant to be used is the lower limit value or more, anti-fogging property becomes good. The HLB value is preferably 14 or smaller, more preferably 13.5 or smaller, and even more preferably 13 or smaller. In a case where the HLB value of the nonionic surfactant to be used is the upper limit value or smaller, adhesiveness can be maintained. In addition, a nonionic surfactant having a polyoxyalkylene skeleton is preferably used. In a case where the nonionic surfactant having the skeleton is used, reduction of adhesiveness and anti-fogging property due to excessive bleedout or transfer of the surfactant can be inhibited.

The polyester resin aqueous dispersion of the present invention can be suitably used for not only adhesives but also raw materials of coating agents and heat sealing agents, and particularly suitably used for adhesives.

<Composition for Adhesion or Coating Use>

A composition for adhesion or coating use according to the present invention is a composition containing the polyester resin aqueous dispersion as an essential component.

For the composition for adhesion or coating use according to the present invention, another polyester resin, aqueous dispersion thereof, and various additives may be blended and used to the extent that the performance of the present invention is not impaired. Although the additive is not particularly limited, examples of the additive include the above-described inorganic particles, organic particles, and waxes in order to form unevenness of the surface.

Examples of the organic particles include polymer particles of polymethylmethacrylate resin, polystyrene resin, nylon resin, melamine resin, benzoguanamine resin, phenol resin, urea resin, silicon resin, methacrylate resin, acrylate resin, and the like, cellulose powder, nitrocellulose powder, wood flour, waste paper powder, rice hull powder, and starch. The polymer particles can be obtained by a polymerization method such as emulsion polymerization, suspension polymerization, dispersion polymerization, soap-free polymerization, and microsuspension polymerization. The organic particles can be used to the extent that the effect of the present invention is not impaired. The form of the particle is not limited, and may be any form such as a powdery form, a particle-like form, a granular form, a flat-plate-like form, and a needle-like form.

Specific examples of the waxes include hydrocarbon-based waxes such as liquid paraffin, natural paraffin, micro wax, synthetic paraffin, and polyethylene wax, fatty acid-based waxes such as stearic acid, fatty acid-based amide waxes such as stearamide, palmitamide, methylene bisstearamide, ethylene bisstearamide, oleamide, and ethanesulfonic acid amide, ester-based waxes such as lower alcohol ester of fatty acid, polyhydric alcohol ester of fatty acid, and fatty acid polyglycol ester, alcohol-based waxes such as cetyl alcohol and stearyl alcohol, olefin-based waxes, natural waxes such as castor wax and carnauba wax, and metal soaps derived from C12 to C30 fatty acid. The waxes can be used to the extent that the effect of the present invention is not impaired.

<Laminate Film>

A laminate film of the present invention is a film in which an adhesive layer or a coating layer formed of the composition for adhesion or coating use according to the present invention is laminated on at least one surface of a base film. The laminate film is obtained by applying the composition to the base film and thereafter drying the obtained product.

The base film is not particularly limited as long as the base film allows the adhesive layer or the coating layer to be formed thereon from the composition for adhesion or coating use according to the present invention. However, the base film is preferably a thermoplastic resin film, and is, for example, a polyester-based resin film, a polypropylene-based resin film, a polyamide-based resin film, a polyvinyl alcohol-based resin film, or a polyvinylidene chloride-based resin film. Among them, a polyester-based resin film is more preferable since it is suitable as a lid for a food packaging container.

The thickness of the base film is preferably 5 μm or more and more preferably 10 μm or more. In a case where the thickness is the lower limit value or more, the base film has good durability. Meanwhile, the thickness of the base film is preferably 50 μm or smaller and more preferably 30 μm or smaller. In a case where the thickness is the upper limit value or smaller, the base film can be practically used for a lid for a food packaging container.

The thickness of the adhesive layer is preferably 0.5 μm or more and more preferably 1 μm or more. In a case where the thickness is the lower limit value or more, adhesiveness becomes good. Meanwhile, the thickness of the adhesive layer is preferably 10 μm or smaller and more preferably 5 μm or smaller. In a case where the thickness is the upper limit value or smaller, adhesiveness and heat-sealability become good.

The laminate film of the present invention is suitable as a component of a packaging material since the laminate film has excellent adhesiveness and anti-fogging property. Particularly, the laminate film is suitable as a lid for a food packaging container of perishable foods and the like. In a case where the laminate film is used as a lid for a food packaging container, the adhesive layer surface of the laminate film and the food packaging container are laminated, whereby the content can be sealed. The food packaging container is, but is not particularly limited to, preferably polyester-based resin.

EXAMPLES

The present invention will be described below in more detail by means of examples. However, the present invention is not limited to the examples. When part(s) is simply described in examples and comparative examples, the part(s) represents part(s) by mass.

<Method for Evaluating Physical Properties>

(Measurement of Composition of Crystalline Polyester Resin)

By using a 400 MHz $^1$H-nuclear magnetic resonance spectroscopic device ($^1$H-NMR), a molar ratio between the polyvalent carboxylic acid component and the polyhydric alcohol component constituting the crystalline polyester resin was quantified. As a solvent, deuterated chloroform was used.

(Measurement of Crystalline Melting Point (Tm) and Glass Transition Temperature (Tg))

By using a differential scanning calorimeter (DSC) DSC-220 manufactured by Seiko Instruments Inc., 5 mg of a sample (crystalline polyester resin) was sealed in a snap-in-lid-type aluminium container, measurement was performed by increasing a temperature from −100° C. to 250° C. at a temperature increase rate of 20° C./minute, and the maximum peak temperature of heat of fusion was obtained as a crystalline melting point. The glass transition temperature was obtained by using the above-described measurement device under the same conditions, as a temperature at an intersection of the extension of a baseline at the glass transition temperature or lower, and a tangent representing the largest inclination between the peak rising start portion and the top of the peak.

(Measurement of Reduced Viscosity (Unit: dl/g))

In 25 cc of a mixed solvent of phenol/tetrachloroethane (mass ratio of 6/4), 0.1 g of a sample of the crystalline polyester resin was dissolved, and the reduced viscosity was measured at a measurement temperature of 30° C. by using a Ubbelohde viscosity tube.

(Measurement of Number-Average Molecular Weight)

The number-average molecular weight was measured by gel permeation chromatography (standard substance: polystyrene resin, mobile phase: tetrahydrofuran).

A sample was dissolved in and/or diluted with tetrahydrofuran such that the resin concentration was about 0.5 mass %, and filtered through a membrane filter that had a hole diameter of 0.5 µm and was made of polytetrafluoroethylene to obtain a sample for the measurement, and the molecular weight was measured by gel permeation chromatography in which tetrahydrofuran was a mobile phase and a differential refractometer was a detector. The flow rate was 1 mL/minute and a column temperature was 40° C. As the column, KF-802, 804L, 806L manufactured by Showa Denko K. K. were used.

(Measurement of Acid Value)

In 40 ml of chloroform, 0.2 g of a sample of the crystalline polyester resin was dissolved, and titration was performed by using 0.01 N potassium hydroxide ethanol solution, and an equivalent (eq/t) per 106 g of the polyester resin was obtained. As an indicator, phenolphthalein was used.

(1) Storage Stability

The polyester resin aqueous dispersion was stored (left as it was) at 25° C. for 6 months, and changes in outer appearance and the shape (viscosity) were checked.

<Evaluation Criteria>

Excellent: No change was found in outer appearance and shape (viscosity).

Good: Although cloudiness and precipitation were found, the shape (viscosity) was not changed.

Poor: Viscosity was increased, separation occurred, or dispersion was poor.

(Production of Laminate Film for Evaluation)

The adhesive composition obtained in each of the examples and the comparative examples was applied to a corona-treated surface of a polyester film (E5107 manufactured by TOYOBO CO., LTD.) having a thickness of 25 µm such that the thickness was 2.5 g/m$^2$ after drying. Subsequently, the obtained product was dried at 160° C. for 30 seconds, and a laminate film for evaluation was obtained.

(2) Peel Strength (Adhesiveness)

An adhesive layer surface of the laminate film for evaluation was heat-sealed to an unstretched amorphous PET sheet having a thickness of 350 µm, at a temperature of 160° C. and a pressure of 2.8 kgf/cm$^2$, for one second. Thereafter, a test piece having a width of 25 mm was cut out, and 180° peeling test was performed at 25° C. at a tensile speed of 100 mm/min, to measure a peel strength.

<Evaluation Criteria>

Excellent: 800 gf/25 mm or more

Good: 500 gf/25 mm or more and smaller than 800 gf/25 mm

Poor: smaller than 500 gf/25 mm (3) Blocking Resistance (Examples 1 to 8, Comparative Examples 1 to 8)

An adhesive layer surface of the laminate film for evaluation was stacked with a polyester film (E5107 manufactured by TOYOBO CO., LTD.) at its surface having not been subjected to corona treatment, to produce a test sample. Thereafter, the test sample was stored at 40° C. under a pressure of 0.9 kgf/cm$^2$ for one day, and the blocking resistance was confirmed according to the following criteria.

<Evaluation Criteria>

Excellent: The test sample had no tackiness.

Good: The test sample had slight tackiness, but there was no problem even if it was used.

Poor: The test sample had tackiness, and a problem arose if it was used.

(4) Blocking Resistance Under High Pressure (Examples 9 to 15)

An adhesive layer surface of the laminate film for evaluation was stacked with a polyester film (E5107 manufactured by TOYOBO CO., LTD.) at its surface having not been subjected to corona treatment, to produce a test sample. Thereafter, the test sample was stored at 25° C. under a pressure of 30 MPa for one day, and the blocking resistance was confirmed according to the following criteria.

<Evaluation Criteria>

Excellent: The test sample had no tackiness.

Good: The test sample had slight tackiness, but there was no problem even if it was used.

Poor: The test sample had tackiness, and a problem arose if it was used.

(5) Water Resistance

The test piece produced for the evaluation item of peel strength was immersed in 25° C. water for one day. Thereafter, the test piece was measured in accordance with the peel strength measurement method, and the obtained value was used for evaluating water resistance.

<Evaluation Criteria>

Excellent: 800 gf/25 mm or more

Good: 500 gf/25 mm or more and smaller than 800 gf/25 mm

Poor: smaller than 500 gf/25 mm (6) Peel Strength Stability

The test piece produced for the evaluation item of peel strength was left as it was at 25° C. for four weeks. Thereafter, the test piece was measured in accordance with the peel strength measurement method, and a peel strength retention rate was calculated according to the following equation. The obtained value was used for evaluating peel strength stability.

$$\text{Strength retention rate (\%)} = (\text{peel strength after the test piece was left as it was}) \div (\text{peel strength before the test piece was left as it was}) \times 100$$

<Evaluation Criteria>

Excellent: 95% or more

Good: 90% or more and smaller than 95%

Poor: smaller than 90%

(7) Initial Anti-Fogging Property

In a container having a volume of 100 cm$^3$, 50 ml of 55° C. hot water was put, and the adhesive layer surface of the laminate film for evaluation was aligned with a mouth portion of the container, and adhered with tape to close the container with a lid. Thereafter, the container was left as it was in a thermostat bath at 5° C. for 30 minutes, and the anti-fogging effect was visually confirmed according to the following criteria.

<Evaluation Criteria>

Excellent: A continuous water film was formed on the film surface, and visibility was good.

Good: Water droplets were partially adhered to the film surface, but visibility was good.

Poor: Water droplets were adhered to the film surface, or visibility was degraded.

(8) Anti-Fogging Property with Elapse of Time

The adhesive layer surface of the laminate film for evaluation was stacked with a polyester film (E5107 manufactured by TOYOBO CO., LTD.) at its surface having not been subjected to corona treatment, to produce a test sample. Thereafter, the test sample was stored at 25° C. under a pressure of 30 MPa for one day. Thereafter, the laminate film for evaluation and the polyester film were peeled off. In a container having a volume of 100 cm$^3$, 50 ml of 55° C. hot water was put, and the adhesive layer surface of the peeled laminate film for evaluation was aligned with a mouth portion of the container, and adhered with tape to close the container with a lid. Thereafter, the container was left as it was in a thermostat bath at 5° C. for 30 minutes, and the anti-fogging effect was visually confirmed according to the following criteria.

<Evaluation Criteria>

Excellent: A continuous water film was formed on the film surface, and visibility was good.

Good: Water droplets were partially adhered to the film surface, but visibility was good.

Poor: Water droplets were adhered to the film surface, or visibility was degraded.

In a case where the initial anti-fogging property was evaluated as poor, the anti-fogging property with elapse of time was not evaluated.

(9) Bleedthrough Property

The adhesive layer surface of the laminate film for evaluation was stacked with a polyester film (E5107 manufactured by TOYOBO CO., LTD.) at its surface having not been subjected to corona treatment, to produce a test sample. Thereafter, the test sample was stored at 25° C. under a pressure of 30 MPa for one day. Thereafter, the laminate film for evaluation and the polyester film were peeled off. In a container having a volume of 100 cm³, 50 ml of 55° C. hot water was put, and the surface (surface which was brought into contact with the adhesive layer surface of the laminate film for evaluation), of the peeled polyester film, having not been subjected to corona treatment, was aligned with a mouth portion of the container, and adhered with tape to close the container with a lid. Thereafter, the container was left as it was in a thermostat bath at 5° C. for 30 minutes, and the anti-fogging effect was visually confirmed according to the following criteria.

<Evaluation Criteria>

Excellent: Water droplets were adhered to the film surface, and anti-fogging property due to the surfactant was not confirmed.

Good: Water droplets were partially adhered to the film surface, and anti-fogging property due to the surfactant was partially confirmed.

Poor: A continuous water film was formed on the film surface, and anti-fogging property due to the surfactant was confirmed.

In a case where the initial anti-fogging property or the anti-fogging property with elapse of time was evaluated as poor, the bleedthrough property was not evaluated.

Examples of Crystalline Polyester Resin

Synthesis of Crystalline Polyester Resin (A-1)

In a reactor having a stirrer, a thermometer, a heater, a cooling device, and a cooler for distillation, 375 parts by mass of terephthalic acid, 148 parts by mass of 1,4-cyclohexanedicarboxylic acid, 198 parts by mass of adipic acid, 9 parts by mass of trimellitic anhydride, 813 parts by mass of 1,4-butanediol, and 0.5 parts by mass of tetrabutyl titanate were put, and esterification was performed over four hours while the temperature was increased to 220° C. After the end of the esterification, pressure was reduced to 10 torr over 60 minutes while the temperature in the system was increased to 250° C., and the pressure was further reduced so as to be in the vacuum state of 1 torr or lower, and polycondensation was performed at 250° C. until a predetermined viscosity was obtained. Thereafter, nitrogen was caused to flow in the system, cooling to 220° C. was performed, 27 parts by mass of trimellitic anhydride was added, and reaction was performed for 30 minutes. After the end of the reaction, the crystalline polyester resin was taken out and cooled, whereby crystalline polyester resin (A-1) was obtained.

Synthesis of Crystalline Polyester Resins (A-2) to (A-16)

Polyester resins (A-2) to (A-16) were synthesized in the same procedure as for the synthetic example of the crystalline polyester resin (A-1). Table 1 indicates the resin compositions and results of measurement of physical properties.

| | Crystalline polyester resin | | A-1 | A-2 | A-3 | A-4 | A-5 | A-6 | A-7 | A-8 |
|---|---|---|---|---|---|---|---|---|---|---|
| Composition | Polyvalent carboxylic acid component (mol %) | Terephthalic acid | 50 | 34 | 65 | 60 | 60 | 42 | 50 | 50 |
| | | 1,4-cyclohexanedicarboxylic acid | 29 | 45 | 15 | 29 | 29 | 32 | 29 | 27 |
| | | Isophthalic acid | | | | | | 20 | | |
| | | Adipic acid | 20 | 20 | 19 | 10 | | 5 | 20 | 20 |
| | | Sebacic acid | | | | | 10 | | | |
| | | 5-sulfoisophthalic acid | | | | | | | | |
| | | Trimellitic anhydride | 1 | 1 | 1 | 1 | 1 | 1 | 1 | 3 |
| | | Trimellitic anhydride (acid was added) | 3 | 3 | 3 | 3 | 3 | 3 | 2 | 5 |
| | Polyhydric alcohol component (mol %) | 1,4-butanediol | 100 | 100 | 100 | 50 | 100 | 100 | 100 | 100 |
| | | Diethylene glycol | | | | 50 | | | | |
| Physical properties | | ηsp/c (dl/g) | 0.60 | 0.65 | 0.62 | 0.54 | 0.70 | 0.62 | 0.58 | 0.35 |
| | | Number-average molecular weight Mn | 15000 | 15000 | 16000 | 15500 | 18000 | 15000 | 14300 | 8500 |
| | | Acid value (eq/t) | 350 | 310 | 360 | 352 | 345 | 350 | 180 | 450 |
| | | Tg (° C.) | −12 | −14 | 1 | 1 | 2 | 12 | −10 | −15 |
| | | Tm (° C.) | 120 | 95 | 158 | 110 | 150 | 104 | 123 | 116 |

-continued

| Crystalline polyester resin | | | A-9 | A-10 | A-11 | A-12 | A-13 | A-14 | A-15 | A-16 |
|---|---|---|---|---|---|---|---|---|---|---|
| Composition | Polyvalent carboxylic acid component (mol %) | Terephthalic acid | 75 | 25 | 45 | 50 | 34 | 34 | 50 | 45 |
| | | 1,4-cyclohexanedicarboxylic acid | 24 | 65 | 54 | 29 | | 20 | 29 | 30 |
| | | Isophthalic acid | | | | | 20 | | | |
| | | Adipic acid | | 9 | | 20 | 46 | 46 | 20 | 20 |
| | | Sebacic acid | | | | | | | | |
| | | 5-sulfoisophthalic acid | | | | | | | | 5 |
| | | Trimellitic anhydride | 1 | 1 | 1 | 1 | 0 | 1 | 1 | |
| | | Trimellitic anhydride (acid was added) | 3 | 3 | 3 | 3 | 3 | 3 | 1 | |
| | Polyhydric alcohol component (mol %) | 1,4-butanediol | 100 | 100 | 80 | 40 | 100 | 100 | 100 | 100 |
| | | Diethylene glycol | | | 20 | 60 | | | | |
| Physical properties | | $\eta$sp/c (dl/g) | 0.60 | 0.54 | 0.57 | 0.60 | 0.40 | 0.62 | 0.50 | 0.60 |
| | | Number-average molecular weight Mn | 16000 | 13800 | 14200 | 15500 | 12000 | 15500 | 10000 | 15000 |
| | | Acid value (eq/t) | 330 | 360 | 333 | 320 | 285 | 260 | 80 | 20 |
| | | Tg (° C.) | 27 | −10 | 4 | −25 | −24 | −30 | −16 | −13 |
| | | Tm (° C.) | 178 | No peak | 117 | No peak | 83 | 89 | 120 | 115 |

Example 1

Production Example of Polyester Resin Aqueous Dispersion (B)
Production of Polyester Resin Aqueous Dispersion (B-1)

The crystalline polyester resin (A-1) was aqueously dispersed in accordance with the following procedure. In a reaction vessel having a stirrer, a capacitor, and a thermometer, 100 parts of the crystalline polyester resin (A-1), 40 parts of ethylene glycol monobutyl ether, 120 parts of methyl ethyl ketone, and 30 parts of isopropyl alcohol were put, and resin was dissolved at 80° C. over three hours. Subsequently, 3.6 parts of dimethylaminoethanol was put therein, and the obtained product was stirred for 30 minutes. Subsequently, 260 parts of hot water was put therein, and the obtained product was stirred for one hour. Thereafter, methyl ethyl ketone and isopropyl alcohol were distilled while the internal temperature was increased to 100° C., to obtain polyester resin aqueous dispersion (B-1). Various characteristics were evaluated, and the results thereof are indicated in Table 2.

Production Example of Polyester Resin Aqueous Dispersion (C)
Production of Polyester Resin Aqueous Dispersion (C-1)

The crystalline polyester resin (A-1) was aqueously dispersed in accordance with the following procedure. In a reaction vessel having a stirrer, a capacitor, and a thermometer, 100 parts of the crystalline polyester resin (A-1) and 120 parts of methyl ethyl ketone were put, and the resin was dissolved while stirring was performed at 75° C. After it was confirmed that the resin was completely dissolved, 30 parts of isopropyl alcohol was put therein, and the obtained product was further stirred for 30 minutes. Subsequently, 3.6 parts of dimethylaminoethanol was put therein, and the obtained product was stirred for 30 minutes. Subsequently, 300 parts of hot water was put therein, and the obtained product was stirred for one hour. Thereafter, methyl ethyl ketone and isopropyl alcohol were distilled while the internal temperature was increased to 100° C., and polyester resin aqueous dispersion (C-1) containing no organic solvent was obtained. Storage stability was evaluated, and the result is indicated in Table 2.

Examples 2 to 8, Comparative Examples 1 to 8

Polyester resin aqueous dispersions (B-2) to (B-16) were each obtained in the same procedure as for the production example of the polyester aqueous resin dispersion (B-1) except that the kind of the crystalline polyester resin was changed. Various characteristics were evaluated, and the results thereof are indicated in Table 2.

| | | Ex. 1 | Ex. 2 | Ex 3 | Ex. 4 | Ex 5 | Ex 6 | Ex. 7 | Ex. 8 |
|---|---|---|---|---|---|---|---|---|---|
| Polyester resin aqueous dispersion B | | B-1 | B-2 | B-3 | B-4 | B-5 | B-6 | B-7 | B-8 |
| | Crystalline polyester resin | A-1 | A-2 | A-3 | A-4 | A-5 | A-6 | A-7 | A-8 |
| | (parts by mass) | 100 | 100 | 100 | 100 | 100 | 100 | 100 | 100 |
| | Water (parts by mass) | 260 | 260 | 260 | 260 | 260 | 260 | 260 | 260 |
| | Ethylene glycol monobutyl ether (parts by mass) | 40 | 40 | 40 | 40 | 40 | 40 | 40 | 40 |

-continued

| | | | | | | | | |
|---|---|---|---|---|---|---|---|---|
| Storage stability | Evaluation | good clouded | excellent | good clouded | excellent | good clouded | excellent | good clouded | good clouded |
| Peel strength | Peel strength [gf/25 mm] | 810 | 900 | 550 | 960 | 600 | 680 | 760 | 550 |
| | Evaluation | excellent | excellent | good | excellent | good | good | good | good |
| Blocking resistance | Evaluation | excellent | good | excellent | good | excellent | good | excellent | excellent |
| Water resistance | Peel strength [gf/25 mm] | 700 | 650 | 520 | 840 | 580 | 600 | 700 | 510 |
| | Evaluation | good | good | good | excellent | good | good | good | good |

| | | |
|---|---|---|
| Polyester resin aqueous dispersion C | | C-1 |
| | Crystalline polyester resin (parts by mass) | A-1 100 |
| | Water (parts by mass) | 300 |
| Storage stability | Evaluation | excellent |

| | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Polyester resin aqueous dispersion B | | B-9 | B-10 | B-11 | B-12 | B-13 | B-14 | B-15 | B-16 |
| | Crystalline polyester resin | A-9 | A-10 | A-11 | A-12 | A-13 | A-14 | A-15 | A-16 |
| | (parts by mass) | 100 | 100 | 100 | 100 | 100 | 100 | 100 | 100 |
| | Water (parts by mass) | 260 | 260 | 260 | 260 | 260 | 260 | 260 | 260 |
| | Ethylene glycol monobutyl ether (parts by mass) | 40 | 40 | 40 | 40 | 40 | 40 | 40 | 40 |
| Storage stability | Evaluation | poor increase of viscosity | excellent | excellent | excellent | poor separation | good clouded | poor poor dispersion | excellent |
| Peel strength | Peel strength [gf/25 mm] | 100 | 870 | 830 | 920 | 750 | 760 | evaluation was impossible | 900 |
| | Evaluation | poor | excellent | excellent | excellent | good | good | evaluation was impossible | excellent |
| Blocking resistance | Evaluation | excellent | poor | poor | poor | good | poor | evaluation was impossible | excellent |
| Water resistance | Peel strength [gf/25 mm] | 100 | 520 | 810 | 380 | 410 | 390 | evaluation was impossible | 200 |
| | Evaluation | poor | good | excellent | poor | poor | poor | evaluation was impossible | poor |
| Polyester resin aqueous dispersion C | Crystalline polyester resin (parts by mass) | | | | | | | | |
| | Water (parts by mass) | | | | | | | | |
| Storage stability | Evaluation | | | | | | | | |

Example 9

To a mixed solvent in which 42 parts by mass of water and 25 parts by mass of isopropyl alcohol were mixed, 100 parts by mass of the polyester resin aqueous dispersion (C-1) was slowly added while stirring was performed, to dilute the polyester resin aqueous dispersion. Subsequently, 0.34 parts by mass of inorganic particles (D-1) was added, and the inorganic particles were sufficiently dispersed while stirring was performed, to obtain polyester resin aqueous dispersion (E-1) containing the inorganic particles. Various characteristics were evaluated, and the results thereof are indicated in Table 3.

Examples 10 to 15

Polyester resin aqueous dispersions (E-2) to (E-6) containing inorganic particles were obtained in the same procedure as for example 9 except that the kinds and the amounts of inorganic particles were changed. In Example 15, no inorganic particles were contained. Various characteristics were evaluated, and the results thereof are indicated in Table 3.

As the inorganic particles, the following particles were used.

D-1: SYLOBLOC ED2 (silica manufactured by GRACE, particle diameter=4.2 μm, pore volume=1.8 ml/g)

D-2: SYLOID K200 (silica manufactured by GRACE, particle diameter=2.5 μm, pore volume=1.6 ml/g)

D-3: SYLOBLOC 35 (silica manufactured by GRACE, particle diameter=3.9 μm, pore volume=1.0 ml/g)

D-4: SYLOBLOC S200 (silica manufactured by GRACE, particle diameter=3.2 m, pore volume=0.6 ml/g)

TABLE 3

| | | Ex. 9 | Ex. 10 | Ex. 11 | Ex. 12 | Ex. 13 | Ex. 14 | Ex. 15 |
|---|---|---|---|---|---|---|---|---|
| Polyester resin aqueous dispersion containing inorganic particles | | E-1 | E-2 | E-3 | E-4 | E-5 | E-6 | — |
| Polyester resin aqueous dispersion | Dispersion | C-1 | C-1 | C-1 | C-1 | C-1 | C-1 | C-1 |
| | Parts by mass | 100 | 100 | 100 | 100 | 100 | 100 | 100 |
| Water | Parts by mass | 42 | 42 | 42 | 42 | 42 | 42 | 42 |
| Isopropyl alcohol | Parts by mass | 25 | 25 | 25 | 25 | 25 | 25 | 25 |
| Inorganic particles | Kind | D-1 | D-1 | D-1 | D-2 | D-3 | D-4 | — |
| | Particle diameter (μm) | 4.2 | 4.2 | 4.2 | 2.5 | 3.9 | 3.2 | — |
| | Pore volume (ml/g) | 1.8 | 1.8 | 1.8 | 1.6 | 1 | 0.6 | — |
| | Parts by mass | 0.34 | 0.88 | 1.75 | 1.75 | 1.75 | 1.75 | — |
| Peel strength | Peel strength [gf/25 mm] | 1010 | 1150 | 890 | 950 | 1020 | 1040 | 930 |
| | Evaluation | excellent | excellent | excellent | excellent | excellent | excellent | excellent |
| Peel strength stability | Retention rate [%] | 92% | 91% | 75% | 94% | 100% | 98% | 100% |
| | Evaluation | good | good | poor | good | excellent | excellent | excellent |
| Blocking resistance under high pressure | | excellent | excellent | excellent | excellent | excellent | excellent | good |

Example 16

To a surfactant-dissolved solution in which 42 parts by mass of water, 25 parts by mass of isopropyl alcohol, and 1.3 parts by mass of a surfactant (F-1) were mixed and dissolved, 100 parts by mass of the polyester resin aqueous dispersion (C-1) was slowly added while stirring was performed. Subsequently, 0.34 parts of the inorganic particles (D-1) was added, and the inorganic particles were sufficiently dispersed while stirring was performed, to obtain polyester resin aqueous dispersion (G-1) containing the surfactant. Various characteristics were evaluated, and the results thereof are indicated in Table 4.

Examples 17 to 23

Polyester resin aqueous dispersions (G-2) to (G-7) containing surfactants were obtained in the same procedure as for Example 16 except that the kinds and the amounts of the surfactants were changed. In Example 23, no surfactant was contained. Various characteristics were evaluated, and the results thereof are indicated in Table 4.

As the surfactant, the following surfactants were used.

F-1: EMULGEN 404 (nonionic surfactant manufactured by Kao Corporation, polyoxyethylene oleyl ether, HLB value=8.8)

F-2: EMULGEN 709 (nonionic surfactant manufactured by Kao Corporation, polyoxyethylene alkyl ether, HLB value=13.3)

F-3: NOIGEN ES-149D (nonionic surfactant manufactured by DKS Co. Ltd., polyoxyethylene oleic acid ester, HLB value=11.5)

F-4: EMULGEN 210P (nonionic surfactant manufactured by Kao Corporation, polyoxyethylene cetyl ether, HLB value=10.7)

F-5: DISPONIL SDS G (anionic surfactant manufactured by BASF, aliphatic alcohol sodium sulfate)

F-6: RH EODOL TW-O120V (nonionic surfactant manufactured by Kao Corporation, polyoxyethylene sorbitan monooleate, HLB value=15.0)

F-7: POEM M-300 (nonionic surfactant manufactured by Riken Vitamin Co., Ltd., glycerin monolaurate, HLB value=5.4)

TABLE 4

| | | Ex. 16 | Ex. 17 | Ex. 18 | Ex. 19 | Ex. 20 | Ex. 21 | Ex. 22 | Ex. 23 |
|---|---|---|---|---|---|---|---|---|---|
| Polyester aqueous dispersion containing surfactant | | G-1 | G-2 | G-3 | G-4 | G-5 | G-6 | G-7 | — |
| Polyester resin aqueous dispersion | Dispersion | C-1 | C-1 | C-1 | C-1 | C-1 | C-1 | C-1 | C-1 |
| | Parts by mass | 100 | 100 | 100 | 100 | 100 | 100 | 100 | 100 |
| Water | Parts by mass | 42 | 42 | 42 | 42 | 42 | 42 | 42 | 42 |
| Isopropyl alcohol | Parts by mass | 25 | 25 | 25 | 25 | 25 | 25 | 25 | 25 |
| Inorganic particles | Kind | D-1 | D-1 | D-1 | D-1 | D-1 | D-1 | D-1 | D-1 |
| | Parts by mass | 0.34 | 0.34 | 0.34 | 0.34 | 0.34 | 0.34 | 0.34 | 0.34 |
| Surfactant | Kind | F-1 | F-2 | F-3 | F-4 | F-5 | F-6 | F-7 | — |
| | HLB vale | 8.8 | 13.3 | 11.5 | 10.7 | — | 15.0 | 5.4 | — |
| | Parts by mass | 1.3 | 1.3 | 1.3 | 1.3 | 1.3 | 1.3 | 1.3 | — |
| Peel strength | Peel strength [gf/25 mm] | 920 | 890 | 780 | 830 | 720 | 590 | 860 | 930 |
| | Evaluation | excellent | excellent | good | excellent | good | good | excellent | excellent |

TABLE 4-continued

| | | Ex. 16 | Ex. 17 | Ex. 18 | Ex. 19 | Ex. 20 | Ex. 21 | Ex. 22 | Ex. 23 |
|---|---|---|---|---|---|---|---|---|---|
| Anti-fogging property | Initial anti-fogging property | excellent | excellent | excellent | excellent | excellent | good | good | poor |
| | Anti-fogging property with elapse of time | excellent | excellent | excellent | excellent | excellent | — | poor | — |
| | Bleedthrough property | excellent | excellent | excellent | excellent | good | — | — | — |

As is apparent from Table 2, in Examples 1 to 8, aqueous dispersibility, storage stability, adhesiveness, blocking resistance, and water resistance were good in a well-balanced manner. Meanwhile, in Comparative example 1, the melting point of the polyester resin was high, and storage stability of the aqueous dispersion was poor. Furthermore, peel strength was low, and water resistance was poor. In Comparative examples 2 and 4, the polyester resin had low crystallinity, and had no melting point, so that blocking resistance was poor. In Comparative example 3, aliphatic dicarboxylic acid was not copolymerized, so that crystallinity was low and blocking resistance was poor. In Comparative examples 5 and 6, in the polyester resin, a copolymerization amount of aliphatic dicarboxylic acid was large, and crystallinity was not sufficient, so that hydrolysis tended to progress, and the aqueous dispersion had poor storage stability, water resistance, or blocking resistance. In Comparative example 7, the polyester resin had a low acid value, and dispersion was poor, so that aqueous dispersion was not able to be obtained. Therefore, characteristics such as peel strength were not able to be measured. In Comparative example 8, 5-sulfoisophthalic acid was used. Thus, although aqueous dispersion was able to be produced, water resistance was poor.

As is apparent from Table 3, as compared with Example 15 in which no inorganic particles were contained, blocking resistance was further improved in Examples 9 to 14 in which the inorganic particles were contained. In examples 13 and 14, peel strength stability was further improved.

As is apparent from Table 4, as compared with Example 23 in which no surfactant was contained, anti-fogging property was able to be exhibited in Examples 16 to 22 in which the surfactant was contained. In addition, in Examples 16 to 19 in which the nonionic surfactant having the HLB value in a specific range was used, peel strength, initial anti-fogging property, anti-fogging property with elapse of time, and bleedthrough property were good in a well-balanced manner.

INDUSTRIAL APPLICABILITY

The adhesive composition or the coating composition according to the present invention, and the laminate film using the adhesive composition or the coating composition have excellent adhesiveness to a base material, blocking resistance, and excellent anti-fogging property when being heat-sealed as a lid for a packaging container.

The invention claimed is:

1. A crystalline polyester resin comprising:
a polyvalent carboxylic acid component and polyhydric alcohol component as copolymerization components, wherein,
the polyvalent carboxylic acid component contains 30 to 70 mol % of terephthalic acid, 10 to 60 mol % of 1,4-cyclohexanedicarboxylic acid, 5 to 30 mol % of aliphatic dicarboxylic acid having 10 or less carbon atoms, and less than 3 mol % of an aromatic dicarboxylic acid component having a sulfonate group relative to 100 mol % total polyvalent carboxylic acid component; and
the polyhydric alcohol component consists of 90 to 100 mol % 1,4-butanediol and 0 to 10 mol % of a polyhydric alcohol component other than 1,4-butanediol relative to 100 mol % total polyhydric alcohol component,
wherein the polyhydric alcohol component other than 1,4-butanediol is at least one selected from the group consisting of ethylene glycol, diethylene glycol, triethylene glycol, propylene glycol, 2,2-dimethyl-1,3-propanediol, glycerol, mannitol, pentaerythritol, trimethylolethane, and trimethylolpropane;
wherein,
an acid value of the crystalline polyester resin is 100 to 600 eq/t;
a glass transition temperature of the crystalline polyester resin is –30 to 30° C.;
a melting point of the crystalline polyester resin is 70 to 160° C.; and
a number-average molecular weight of the crystalline polyester resin is 5,000 to 40,000.

2. The crystalline polyester resin according to claim 1, wherein a total content of the terephthalic acid and the 1,4-cyclohexanedicarboxylic acid is 40 mol % or more and 95 mol % or less.

3. The crystalline polyester resin according to claim 1, wherein a content of a polyvalent carboxylic acid component other than the terephthalic acid, the 1,4-cyclohexanedicarboxylic acid and the aliphatic dicarboxylic acid having 10 or less carbon atoms is 40 mol % or less.

4. The crystalline polyester resin according to claim 1, wherein when a total amount of all the polyvalent carboxylic acid components and all the polyhydric alcohol components is 200 mol %, a total content of a tri- or higher functional polyvalent carboxylic acid component and a tri- or higher functional polyhydric alcohol component is 0.5 mol % or more and 5 mol % or less.

5. The crystalline polyester resin according to claim 1, wherein the polyhydric alcohol component consists of 100 mol % 1,4-butanediol.

6. A polyester resin aqueous dispersion containing the crystalline polyester resin of claim 1.

7. The polyester resin aqueous dispersion according to claim 6, wherein the polyester resin aqueous dispersion contains 1 mass % or less of an organic solvent.

8. The polyester resin aqueous dispersion according to claim 6, wherein the polyester resin aqueous dispersion contains 0.1 to 10 parts by mass of inorganic particles having average particle diameter of 1 μm or more to 10 μm or less when the total amount of the crystalline polyester resin is taken as 100 parts by mass.

9. The polyester resin aqueous dispersion according to claim 8, wherein a pore volume of the inorganic particles is smaller than 2.0 mL/g.

10. The polyester resin aqueous dispersion according to claim 6, wherein the polyester resin aqueous dispersion contains 0.1 to 10 parts by mass of a surfactant which is at least one selected from the group of an anionic surfactant and a nonionic surfactant when the total amount of the crystalline polyester resin is taken as 100 parts by mass.

11. The polyester resin aqueous dispersion according to claim 10, wherein the nonionic surfactant has a HLB value of 6 to 14 and a polyoxyalkylene skeleton.

12. A composition for adhesion or coating, comprising the polyester resin aqueous dispersion according to claim 6.

13. A laminated film formed by laminating a layer formed by applying the composition for adhesion or coating of claim 12 and a thermoplastic resin film.

14. The laminated film according to claim 13, wherein the thermoplastic resin film is a polyester-based resin film.

15. The laminated film according to claim 13, wherein a thickness of the layer of the composition for adhesion or coating is in a range of 0.5 μm to 10 μm.

16. A packaging material, comprising the laminated film according to claim 13 as a constituting component.

17. A lid member for food packaging container, comprising the packaging material according to claim 16 as a constituting component.

18. A food packaging container constituted of a laminate of a polyester-based resin and the lid member of claim 17.

* * * * *